United States Patent [19]
Vind

[11] 3,948,478
[45] Apr. 6, 1976

[54] HYDRAULIC SERVO SYSTEM FOR STEAM TURBINES

[75] Inventor: Tyge Vind, Finspong, Sweden

[73] Assignee: Stal-Laval Turbin AB, Finspong, Sweden

[22] Filed: Mar. 21, 1974

[21] Appl. No.: 453,361

[30] Foreign Application Priority Data
Mar. 23, 1973 Sweden............................ 7304 1006

[52] U.S. Cl.................................... 251/29; 415/17
[51] Int. Cl.² ........................................ F16K 31/12
[58] Field of Search ............... 251/25, 29; 137/596; 415/17

[56] References Cited
UNITED STATES PATENTS
3,794,292   2/1974   Jaegtnes............................. 251/25 X Primary Examiner—Arnold Rosenthal
Attorney, Agent, or Firm—Eric Y. Munson

[57] ABSTRACT

A hydraulic servo system for steam turbines providing rapid closing of the main valve between the turbine and the boiler to stop the operation by opening a drainage valve whereby hydraulic fluid is drained immediately from the servo motor which normally maintains the main valve in open position. Secondary valve means are actuated by the resultant pressure drop to drain hydraulic fluid from a portion of the servo system, which is throttled from the servo motor portion, after a predetermined time lapse, and to block off supply of hydraulic fluid to the system. The main valve may be reopened by closing the drainage valve and by actuating the secondary valve means to reconnect the hydraulic fluid source to the throttled portion of the system whereby pressure therein is rapidly restored to a degree sufficient to supply fluid to the servo motor.

2 Claims, 2 Drawing Figures

HYDRAULIC SERVO SYSTEM FOR STEAM TURBINES

The present invention relates to a hydraulic servo system for a steam turbine, comprising a means for rapid release of the main valve of the turbine or a special valve for rapid closing, and means for unloading the pressure in the other hydraulic servo systems of the turbine as a consequence of said release. The hydraulic system according to the invention is fed by way of a valve system from a feeding source. When, in the description, the main valve is mentioned this designation also refers to a possible quick-closing valve.

In addition to the different normal operational functions, a hydraulic servo system for a steam turbine must also be able to achieve a rapid closing of the main valve of the turbine, after which the other parts of the system should normally be decompressed. In order to achieve a sufficiently quick and safe closing of the main valve the servo motor of said valve should as a rule be drained and separated in a proper manner before the pressure in the rest of the system is changed. According to the present invention drainage of the rest of the system is performed in dependence of the pressure drop of the servo motor of the main valve, whereby the main valve will be closed before anything else occurs.

Figure 1:
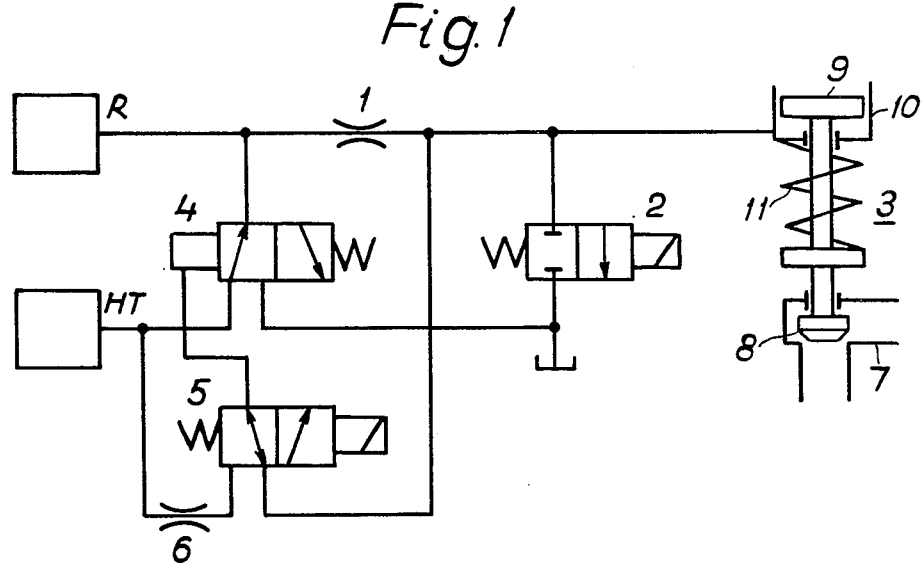
Figure 2:
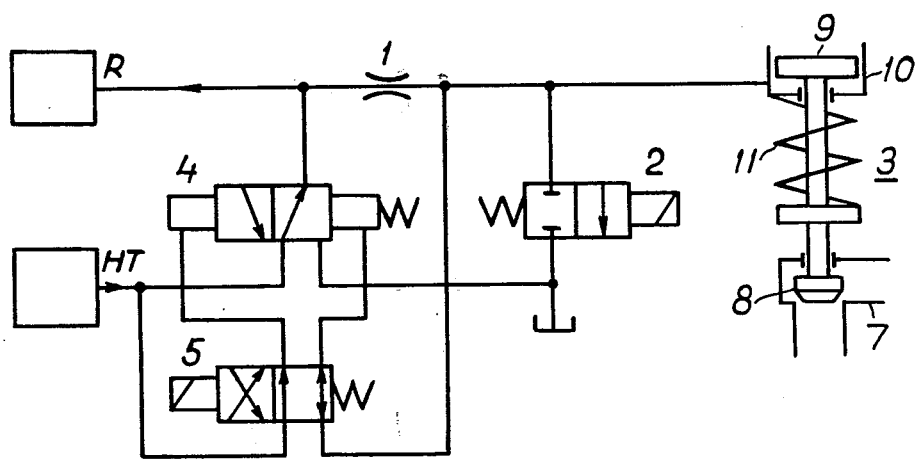

The system according to the invention is constructed according to the accompanying claims and will be described in other respects with reference to the accompanying drawing, in which FIGS. 1 and 2 illustrate different embodiments of a hydraulic servo system according to the invention.

FIG. 1 shows a feeding system HT for a hydraulic servo system of a steam turbine (not shown). The feeding system, which is only shown as a block, comprises above all a pump for the working liquid used in the system and besides this it may suitably comprise a pressure receptacle and automatic control devices for maintaining the pressure at a desired value.

The feeding system is connected to the quick-release device for the main valve 3 of the steam turbine and to a control servo system R for the other normal functions of the turbine. The servo system R is not shown in detail as this is not important for the invention, but it comprises control members for the various control functions of the turbine such as steam pressure, number of revolutions, power, etc.

The main valve 3 is located in a conduit 7 between boiler and turbine. This valve comprises a valve cone 8 mounted on a piston 9 in the servo cylinder 10 of the valve. A spring 11 attempts to close the valve 3 by pressing the valve cone 8 downwards. Opening and closing of the main valve 3, during normal operation, during starting and stopping, is performed by introducing pressure liquid in a manner not shown on the lower side of the piston 9. Rapid closing of the main valve 3, however, is accomplished with the help of the valve 2 which belongs to the system according to the invention.

The feeding system HT feeds the control servo system R by way of the reconnection valve 4. Between this and the main valve there is a throttling means 1. The valve 4 is controlled, in turn, by the valve 5 and the pressure between the throttling means 1 and the main valve, which will be further explained.

During normal operational conditions, i.e. when the turbine is running, the valves 2 – 5 are positioned as shown. The main valve 3 is open. The control part of the valve 4 is connected to the pressure conduit to the right of the throttling means 1 by way of valve 5.

Rapid closing of the main valve 3 is performed by opening the valve 2, the cylinder 10 and the conduit to the right of the throttling means 1 then rapidly being drained, and the spring 11 presses down the valve cone 8 towards its seat and the conduit 7 is blocked.

Because of the throttling means 1 the pressure to the left of this is maintained primarily so that the closing of the main valve is not disturbed from here. As the pressure drops to the right of the throttling means 1, however, the control part of the valve 4 will be drained through the valves 5 and 2, valve 4 then being switched over and draining the control system R so that the entire system is without pressure except the feeding system HT which is blocked by switching the valve 4.

Reopening of the main valve is performed by closing valve 2 and briefly switching over valve 5 which, for example, can be a magnet valve. The feeding system HT is connected direct to the control part of valve 4 which is switched back to the shown position. The pressure grows rapidly in the servo system R and more slowly to the right of the throttling means 1. When the pressure here has reached its full value valve 5 is switched back to the shown position, while valve 4 is maintained by the pressure to the right of the throttling means 1.

Between the feeding system HT and valve 5 there has been inserted a throttling means 6 in order to prevent too large liquid flows from the reaching the release system in case of a fault in the valve 5.

FIG. 2 shows a somewhat different shape of the valves 4 and 5. The manner of action, however, is substantially the same. According to FIG. 2 the valve 4 is provided with double control members and the valve 5 with corresponding double through flows.

When the valve 2 has released the pressure drop to the right of the throttling means 1 will unload the right control member of the valve 4 over the valve 5, the valve 4 being switched over and draining the control system R. Reopening is carried out as according to FIG. 1 by switching over valve 5 for so long a time that the valve 4 is switched back to the shown position and the pressure to the right of the throttling 1 has had time to grow up. With this shape of the valves there is no connection from the feeding system HT over valve 5 to the release valve 2, so the throttling means 6 according to FIG. 1 can be omitted.

I claim:

1. In a hydraulic servo system for steam turbines and the like for actuating the main valve between the turbine and the steam source in addition to other normal operational functions, including feeding source
   means for supplying hydraulic fluid of a predetermined pressure to said system and
   a servo motor having a connection to said system and actuated by the hydraulic fluid normally so as to maintain the main valve in opening position to supply steam to the turbine; the improvement enabling drainage of the servo motor and the system independent of one another comprising
   a. drainage means operative to drain hydraulic fluid from said servo motor to rapidly close said main valve;
   b. adjustable valve means connected to said hydraulic fluid supply means and to said drainage means between the two;

c. hydraulic conduit means located between said adjustable valve and said drainage means for feeding hydraulic fluid from the supply means to said servo system;

d. throttling means located in the hydraulic conduit means between said drainage means and said valve means for forming a throttled portion in said system;

e. said valve means being provided with control means controlled by the pressure drop between said throttling means and said servo motor to drain hydraulic fluid from said throttled portion and the servo system and effective to interrupt the supply of hydraulic fluid thereto in response to the pressure drop resulting from rapid drainage of hydraulic fluid from the servo motor through said drainage means.

2. The improved hydraulic servo system for steam turbines and the like according to claim 1, in which the valve means comprises a second adjustable valve means for control of said control means connected to said hydraulic fluid supply means and to said hydraulic conduit between said throttling means and said drainage means and operative to drain residual hydraulic fluid from said first valve means upon the interruption of supply of hydraulic fluid thereto for release thereof and to restore the supply thereto to restore it and to said servo system to reopen said main valve.

* * * * *